July 24, 1956  J. A. MEYER  2,755,670
INTERENGAGING GEAR STARTING MECHANISMS
Filed April 18, 1955

INVENTOR.
JAMES A. MEYER
BY
Andrus & Scales
ATTORNEY

United States Patent Office 2,755,670
Patented July 24, 1956

2,755,670

INTERENGAGING GEAR STARTING MECHANISMS

James A. Meyer, Oshkosh, Wis.

Application April 18, 1955, Serial No. 501,905

7 Claims. (Cl. 74—8)

This invention relates to interengaging gear starting mechanisms particularly for two-cycle high-speed, high-compression engines.

The invention comprises spring and abutment means which maintains the initially established starting engagement of the gears and without preventing normal disengagement when the engine starts particularly prevents relative disengagement of the gears in one direction as when cylinder compression periodically causes the driven gear to overrun the drive gear, and which otherwise allows relative disengagement of the gears in the other direction in the event a cylinder is fired prematurely to start the engine in the wrong direction of rotation.

The object of the invention is to assure the protection of the starting mechanism against overloading and reduce the wear and noise of the gears during their engagement and disengagement.

Another object is to provide for the relative movement of the gears and of the spring and abutment means of the invention within the minimum confines of the engine enclosure.

The drawings furnished herewith illustrate the best mode of carrying out the invention as presently contemplated and set forth hereinafter.

Figure 1:
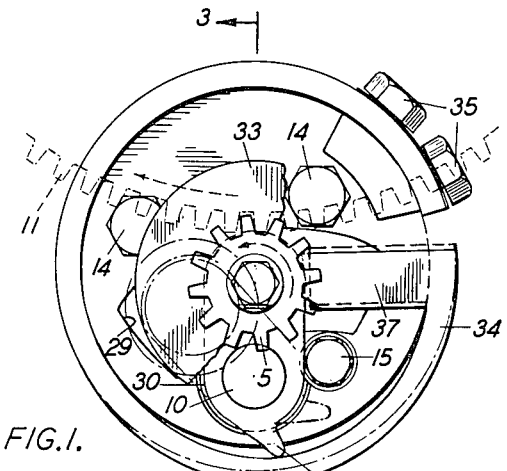
Figure 1 is a plan view of the starting mechanism with the drive gear shown in the starting position maintained by the spring. The driven gear and the normal disengaged position of the drive gear are shown in broken lines.
Figure 2:
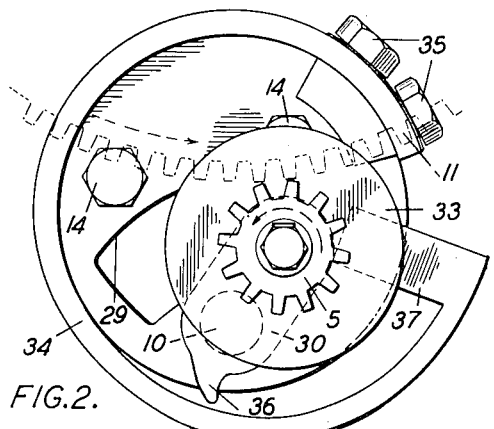
Fig. 2 is a view similar to Figure 1 showing the gears in opposite rotation as when the engine starts in the wring direction.
Figure 3:
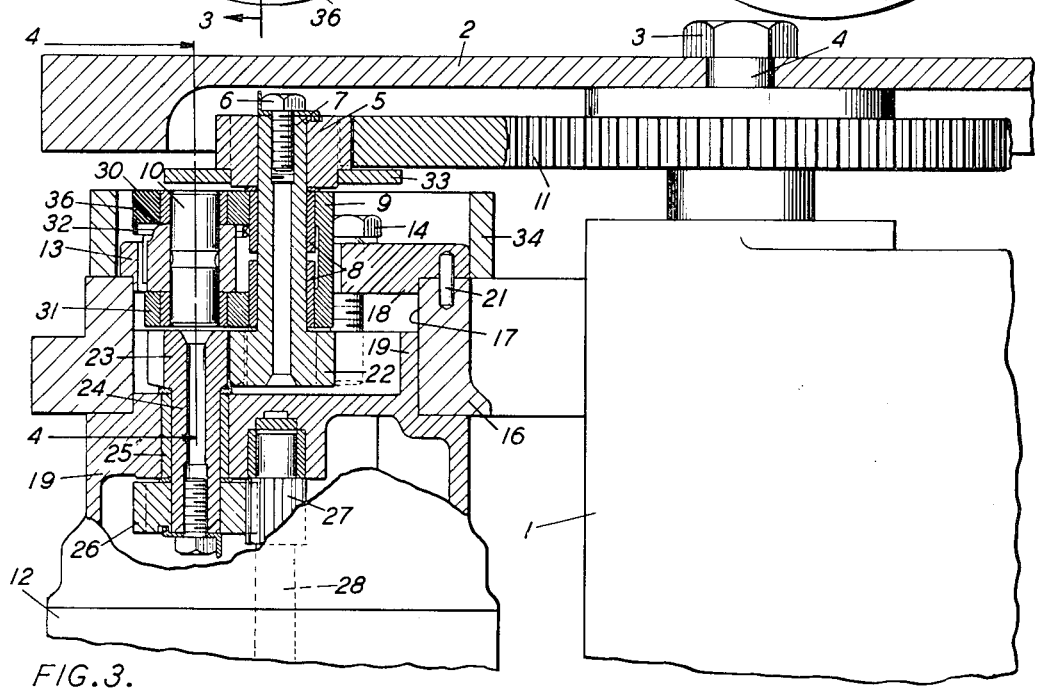
Figure 4:
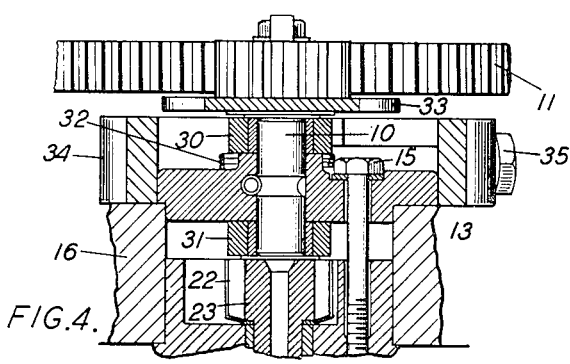

Fig. 3 is a side elevation of a portion of the engine and bracket carrying the electric starting motor and mechanism. The drive and driven gears are shown in interengagement. The starting mechanism is sectioned as on line 3—3 of Figure 1; and Fig. 4 is a section taken on line 4—4 of Fig. 3.

The engine 1 shown in part in Fig. 3 of the drawings includes the flywheel 2 secured by the nut 3 on the upper end of the crankshaft 4. The drive gear 5 of the starting mechanism is secured by screw 6 to the upper end of the shaft 7 carried for rotation in the bearings 8 of the arm 9. Arm 9 is pivotally mounted on the pin 10 to allow movement of gear 5 into and out of intermeshing engagement with the larger driven gear 11 fixed to crankshaft 4 beneath flywheel 2.

The electric starting motor housing 12 and the circular plate 13 which carries pin 10 are joined by the bolts 14 and 15 and held in spaced relation by the supporting engine bracket 16 disposed between the plate and housing. Bracket 16 is provided with a circular vertical opening 17 to receive and locate corresponding projecting portions 18 and 19 of plate 13 and motor housing 12, respectively, so that by loosening bolts 14 and 15, plate 13 and housing 12 may be adjusted by turning relative to bracket 16. Plate 13 and housing 12 are otherwise secured by the pin 21 disposed in registering holes formed in the plate and bracket 16.

The gear 22 formed by the lower end of shaft 7 beneath arm 9 is driven by the gear 23 formed by the upper end of the shaft 24 supported in the bearing 25 carried in the projecting end portion 19 of housing 12. The lower end of shaft 24 carries the gear 26 within housing 12 and is driven by the gear 27 of the armature shaft 28 of the motor. Plate 13 and motor housing 12 with shaft 24 and pin 10 are secured always in exact alignment whereby the intermeshing of gears 22 and 23 is maintained in any position of arm 9.

The end of arm 9 carrying bearings 8 is disposed for movement in the arcuate slot 29 formed in plate 13 and joins the upper and lower members 30 and 31 of the arm respectively mounted above and below plate 13 on pin 10. The spring 32 disposed between the plate and upper member 30 has opposite ends respectively secured thereto to bias arm 9 on pin 10 in the direction oppositely of rotation of the engine crankshaft, and specifically counter-clockwise as shown in the drawings.

In starting, the inertia of shaft 7 provided by the disc 33 fixed thereto immediately beneath gear 5 causes the starting torque of the motor to first effect rotation of arm 9 on pin 10 and against spring 32 and to move gear 5 about pin 10 into engagement with gear 11.

According to the invention, the circular spring 34 is secured at one end by the bolts 35 to plate 13 and extends tightly around the periphery of the plate to be engaged intermediate the ends thereof by the cam 36 of arm 9 and by the arm at the free end 37 of the spring which projects inwardly over the plate.

Cam 36 comprises a projection of member 30 of arm 9 to engage spring 34 immediately upon initial intermeshing of gears 5 and 11 as described and so that the further rotation of gear 5 by reaction continues the movement of arm 9 until the latter engages end 37 of spring 34. The movement of cam 36 of arm 9 referred to engages and pushes spring 34 away slightly from plate 13 but without any substantial displacement of the free end 37 of the spring. The frictional engagement of cam 36 and the spring effected by such movement secures the arm against return movement as by spring 32 and particularly, according to the invention, as when cylinder compression of the engine momentarily tends to cause gear 11 to overrun gear 5.

The engagement of arm 9 with end 37 of spring 34 as maintained under tension by plate 13 firmly locates gears 5 and 11 in proper intermeshing engagement for starting the engine and, upon starting, the engine turns gear 11 to overrun gear 5 and moves arm 9 to release cam 36 from spring 34 whereupon spring 32 is effective to return the arm in the direction of and to the normal disengaged position as described with gear 5 completely clear of gear 11.

Further according to the invention, spring 34 is adapted to yield to movement of arm 9 in the opposite direction on pin 10 sufficiently to allow gears 5 and 11 to disengage for opposite rotation as in the event that the engine misfires or otherwise starts in the reverse direction.

Since such opposite rotation seldom continues for more than a fraction of one revolution of the engine crankshaft the short period that the teeth of the gears strike each other does not adversely affect the life of the gears while the protection of the gears against overloading afforded by the spring is of prime importance.

Spring 34 continuously biases gear 5 against gear 11 during their opposite rotation, and particularly so that the reengagement of gears 5 and 11 is immediately effected when such opposite rotation discontinues. When the engine starts in reverse, movement of arm 9 expands spring 34 to release cam 36 and when the arm is returned to the drive position the spring contracts to reengage cam 36 and resecure the arm as described.

The single spring 34 under the tension established by plate 13 thus provides both the restraining and positioning of arm 9 which is responsive to both the starting and stopping of the starter motor and the starting of the engine in the right or wrong direction.

Various modes of carrying out the invention are contemplated as within the scope of the following claims particularly pointing out and distinctly claiming the subject matter which is regarded as the invention.

I claim:

1. In an engine starting mechanism including a drive gear and a pivotally movable arm carrying said gear for rotation in a normal first position spaced from a corresponding gear to be driven to start the engine in a given direction, said arm carrying said gear for separate movement thereof in an arc about an axis spaced from and parallel to that of said rotation to a second position as for intermeshing of the drive and driven gears to start the engine and to a third position as for allowing at least temporary opposite rotation of the gears in the case the engine starts in reverse, a circular plate carrying said arm, and a circular spring having one end fixed to said plate and expanded thereby and extending around said plate under tension, said arm and spring having abutment means separately engageable to position and frictionally secure said arm in said second position and said spring being otherwise yieldable away from said plate to allow movement of the arm from said second to said third position.

2. In a starting mechanism for an engine having a driven gear rotating directly with engine operation, a drive gear, a pivotally movable arm carrying said gear for rotation in a normal first position spaced from said driven gear and for separate movement in an arc about an axis spaced from and parallel to that of said rotation to a second position for intermeshing of the drive and driven gears as to start the engine and to a third position allowing at least temporary opposite rotation of the gears as in case the engine starts in reverse, a circular plate carrying said arm, and a circular spring having one end fixed to said plate and expanded thereby and extending around said plate under tension, said arm having cam means engageable with said spring intermediate the ends thereof to frictionally secure said arm in said second position, and said spring having its free end disposed to be engaged by said arm to locate said arm in said second position and being otherwise yieldable away from said plate to allow movement of the arm to said third position.

3. In a starting mechanism for an engine having a driven gear rotating directly with engine operation, a circular plate supported by the engine and having an opening therethrough and a pin located adjacent to said opening, an arm pivotally mounted at one end thereof on said pin, a rotatable shaft carried at the other end of said arm and extending through said opening, a drive gear mounted on one end of said shaft and at one side of said plate for rotation in a normal first position spaced from said driven gear and for separate movement by said arm on said pin to a second position for intermeshing with said driven gear as to start the engine and to a third position allowing at least temporary opposite rotation of the gears as in case the engine starts in reverse, geared drive means on the other side of said plate to rotate said shaft, a weight fixed to said shaft to provide inertia whereby the initial torque applied by said drive means to said shaft effects movement of said arm from said first to said second position, and a circular spring having one end fixed to said plate and expanded thereby and extending around said plate under tension, said arm having cam means engageable with the intermediate portion of said spring to frictionally secure said arm in said second position, and said spring having its free end disposed to be engaged by said arm to locate said arm in said second position and being otherwise yieldable away from said plate to allow movement of the arm to said third position.

4. In a starting motor mechanism for an engine having a motor housing and a driven gear rotating directly with engine operation, a circular plate having a slot therein and a pin located adjacent thereto, an engine bracket having an opening and bolts joining said plate and the motor housing on opposite sides of the bracket, an arm pivotally mounted at one end thereof on said pin and a rotatable shaft carried at the other end of said arm and extending through said slot into said opening, geared drive means in said bracket opening including a gear on the end of said shaft extending therein, a drive gear mounted on the other end of said shaft for rotation in a normal first position spaced from said driven gear and for separate movement by said arm on said pin to a second position for intermeshing with said driven gear as to start the engine and to a third position allowing at least temporary opposite rotation of the gears as in case the engine starts in reverse, a weight fixed to said shaft to provide inertia whereby the initial torque applied by the motor through said drive means to said shaft effects movement of said arm from said first to said second position, and a circular spring having one end fixed to said plate and expanded thereby and extending around said plate under tension, said arm having cam means engageable with an intermediate portion of said spring to frictionally secure said arm in said second position, and said spring having its free end disposed to be engaged by said arm to locate said arm in said second position and being otherwise yieldable away from said plate to allow movement of the arm to said third position.

5. The invention of claim 4 wherein the plate and motor housing are rotatable together respecting said bracket for adjustment of the first and second positions of said drive gear respecting the driven gear.

6. In a starting motor mechanism for an engine having a motor housing and a driven gear rotating directly with engine operation, a circular plate having a slot therein and a pin located adjacent thereto, an engine bracket having an opening and bolts joining said plate and motor housing on opposite sides of the bracket, an arm pivotally mounted at one end thereof on said pin and a rotatable shaft carried at the other end of said arm and extending through said slot into said opening, geared drive means in said bracket opening including a gear driven by said motor shaft and a gear on one end of said rotatable shaft, a drive gear mounted on the other end of said rotatable shaft for rotation therewith in a normal first position spaced from said driven gear and for separate movement by said arm on said pin to a second position for intermeshing with said driven gear as to start the engine and to a third position allowing at least temporary opposite rotation of the gears as in case the engine starts in reverse, a weight fixed to said shaft to provide inertia whereby the initial torque applied by the motor through said drive means to said shaft effects movement of said arm from said first to said second position, and a circular spring having one end fixed to said plate and expanded thereby and extending around said plate under tension, said arm and spring having abutment means separately engageable to position and frictionally secure said arm in said second position and said spring being otherwise yieldable away from said plate to movement of the arm to said third position.

7. The invention of claim 4 wherein the plate and motor housing are rotatable together respecting said bracket for adjustment of the first and second positions of said drive gear respecting the driven gear.

No references cited.